United States Patent Office 3,676,186
Patented July 11, 1972

3,676,186
SOIL RETARDANT COATING AND METHOD FOR FORMING THE SAME
Louis L. Pytlewski, Philadelphia, Pa., assignor to Research Corporation, New York, N.Y.
No Drawing. Continuation-in-part of application Ser. No. 591,717, Nov. 3, 1966. This application Sept. 11, 1970, Ser. No. 71,426
Int. Cl. B44d 1/14; B05b 5/00; C03c 23/00
U.S. Cl. 117—69
12 Claims

ABSTRACT OF THE DISCLOSURE

Positively charged coatings are provided comprised of positively charged particles of a salt of a metal, the metallic element of which exhibits two stable states of oxidation simultaneously while in solution. The coatings may further have an additional layer of negatively charged silica particles over the positively charged coatings. The coatings of this invention are substantive to negatively charged surfaces such as glass and are also hydrophilic. When water strikes the coated surface, there is a preferential wetting out and removal of soils from the surface. The coatings of this composition are especially useful as soil retardant coatings for window glass and other negatively charged surfaces such as textiles, metals, painted surfaces, plastic and the like.

CROSS REFERENCE TO RELATED APPLICATION

This application is a continuation-in-part of copending application 591,717, filed Nov. 3, 1966, now abandoned.

BACKGROUND OF THE INVENTION

(1) Field of the invention

This invention relates to positively charged coatings and to the method for forming the same on negatively charged surfaces. More particularly, this invention is concerned with the preparation of soil retardant composition.

(2) Description of the prior art

The treatment of materials to make them more soil retardant and easier to clean is a highly developed art with many suggestions having heretofore been made to improve soil resistance of various materials. However, the suggestions heretofore made have been unsatisfactory, being either marginal in the improvement obtained, of a temporary nature, or in some cases were rather costly to apply. Most of the methods heretofore suggested employed silica in various forms. In general, the silica treatments had to be applied in a rather complex manner in order to obtain a more or less permanent effect. The use of colloidal dispersions of silica applied directly to a heated surface is disclosed in Walsh, U.S. Pat. 2,978,349. A further heat treating method of using a silica is disclosed in Dempcy, U.S. Pat. 3,013,898 wherein painted surfaces are treated at high temperatures with silica sols. The use of heat is generally objectionable in most cases especially when the article is fixed in position such as window glass. In the absence of heat being applied to the surfaces, colloidal silica dispersions give a generally unsatisfactory, easy to remove, non-uniformly coated product and therefore have not gone into general use as soil retardants for solid surface, particularly where soil retardant properties of long duration are required.

The prevention of soiling is important with regard to most types of materials including fabrics, woods, metals, plastics, paper and the like. The problem of soiling, however, is especially acute with regard to window glass and the like used both in the home and in commercial buildings. Glass is widely used in buildings, especially commercial buildings with some buildings being made with essentially glass walls. The exterior surfaces of these buildings are especially subject to heavy soiling by atmospheric contaminants.

The repeated cleaning of the exterior surfaces presents special problems because of both the expense and difficulties of reaching the glass areas especially on high rise buildings and the corresponding shortage of labor available for this type of work. It would be highly advantageous to have a treatment which would both improve the soil resistance of the glass panes and would reduce, if not substantially eliminate, the expense and labor involved in cleaning of the soiled surfaces.

It is accordingly an object of this invention to provide coatings for surfaces which will increase the soil resistance of the treated surface.

It is an additional object of this invention to provide soil retardant coatings which are simple to apply and give long lasting soil resistance to the coated surfaces.

It is a still further object of this invention to provide a soil retardant coating which can be applied to glass panes and which will both increase the soil resistance and also impart self cleaning properties to the glass surface.

It is an additional object to provide positively charged surfaces on material inherently having negatively charged surfaces.

Other objects and advantages of this invention will become further apparent hereinafter and from the continued reading of the specification and subjoined claims.

SUMMARY OF THE INVENTION

The objects of this invention have been achieved by providing a thin coating on the surfaces to be treated which is obtained by applying to the surfaces a positively charged hydrosol of a metal which exhibits two stable states of oxidation simultaneously when in solution.

DESCRIPTION OF THE PREFERRED EMBODIMENTS

In the description of the preferred embodiments, particular reference will be made to the treatment of glass particularly in the form of window panes and the like, since this is one of the more difficult and commercially important surfaces that can be rendered soil retardant by the compositions of this invention. It should be appreciated, however, that this invention is not limited to the treatment of glass surfaces but can be used with various other materials such as textiles, plastics, paper, painted surfaces and the like.

The surfaces of many materials appear to be very smooth when examined visually. The typical glass pane when newly manufactured appears to be extremely smooth, however when it is examined microscopically, it can be seen to contain a considerable number of surface imperfections, such as grooves, pores, riles and the like. Glass which has been in use and exposed to the elements has an even greater degree of roughness and imperfections. These imperfections, while invisible to the naked eye, do have a major effect on the soiling property since the imperfections mechanically hold the soils on the surface of the glass.

Untreated glass surfaces, once soiled, are not readily cleaned by rain or other natural elements and must be washed with soap or detergents, rinsed and then wiped dry. The reason that glass panes are not cleaned by the rain and other natural elements and in fact, are made to appear even more dirty by being contacted by droplets of rain water is that the glass is inherently hydrophobic. The rain does not wet out the surface of the glass and there is a tendency for the water, contacting the surfaces of the glass to bead up and form spots on the glass surfaces together with the dirt.

It has been found in accordance with the teachings of this invention that these two major causes of soiling can be corrected by applying to the surface to be treated a colloidal hydrosol of a metal salt in which the metal thereof exhibits two stable states of oxidation while in solution. The hydrosol solutions are almost always colored to some extent apparently due to the rapid exchange of electrons as shown by the following charge transfer mechanism.

$$M^n \rightleftarrows M^{n+x} + e^-$$

More specifically, the metallic elements are believed to follow the following electron exchanges.

$$Sn^{+2} \rightleftarrows Sn^{+4} + 2e^-$$

$$Fe^{+2} \rightleftarrows Fe^{+3} + 1e^-$$

$$Ni^{+2} \rightleftarrows Ni^{+4} + 2e^-$$

$$Bi^{+3} \rightleftarrows Bi^{+5} + 2e^-$$

A further requirement for the hydrosols is that the metallic ions of the hydrosol hydrolize rapidly in the initial step and then very slowly, if at all, because of the rapid electronic exchange. For example, in the oxidation of tin $$Sn^{+4} + OH_2 \rightleftarrows Sn(OH)^{+3} + H^+$$

would be very rapid while the second step of $$Sn(OH)^{+3} + HOH \rightleftarrows Sn(OH)_2 + 2 + H^+$$

would be very slow or non-existent. The partial hydrolysis of the metal ion or ions is the source of the colloidal particles and the incomplete hydrolysis is believed to be the source of the high positively charged, finely divided colloidal particles.

The metallic salts which may be used in this invention are the salts of for example, tin, iron, nickel and bismuth as noted above. In addition, salts of metals such as titanium, vanadium, chromium, cobalt, copper, arsenic, molybdenum, antimony, tungsten and lead may also be used in this invention. Some typical metal salts which may be used in the hydrosols employed in the coatings of this invention are:

$$SnCl_4 \cdot 5H_2O, FeCl_3 \cdot 6H_2O, Cr(C_2O_4)_3$$

$$CrCl_3, BiCl_5, CoCl_3 \text{ and } Fe(C_2H_3O_2)_3$$

Other salts of the above noted metals may likewise be such as the nitrates and sulfates which are soluble in water and the ions formed must be weak oxidizing and reducing agents.

The colloidal hydrosols when applied to the surface, because of their highly positive nature, form a tight bond to the negatively charged glass surfaces. The coating formed by the hydrosol fills in the imperfections in the surface of the glass thereby reducing the mechanical adhesion of soils to the treated surfaces. What is of even greater significance however, is that the surfaces of the treated material, for example glass is converted from a hydrophobic surface to a hydrophilic surface. The surface of the glass will resist soiling and what soiling does occur is removed by the elements such as rain. The treated glass surfaces wet out readily and the rain water and the soils flow off the glass surfaces. Furthermore, because of the hydrophilic nature of the glass coated surfaces, they will dry spot free and clean.

The treatment of the glass surfaces is very simple and can be conducted as the glass is manufactured or it can be applied to the surfaces of the glass already installed by simply wiping the hydrosol solutions onto the glass as part of the window washing process. In existing installations, the window would be washed in the normal manner with a detergent and water to remove the adhered soils. The hydrosol solution would then be applied to the cleaned surface and any excess amount would then be washed off with plain water. After treatment, however, the window will not have to be washed on a regular basis. Even in periods of prolonged drought or if the window is not exposed to the elements, it can be cleaned by simply hosing the glass surface down with plain water. The treatment of this invention results in a coating of about 1,000 angstroms thickness which does not noticeably change the color or transparency of the treated surfaces. The treatment of the glass surfaces is a relatively permanent treatment despite the simplicity with which it can be applied. The effectiveness of the treatment is of course dependent upon the particular conditions encountered in a given application. It has been found, however, that even after exposure to the environment in a highly developed commercial metropolitan area that the treatment was still highly effective even after 18 months of continuous exposure. The exact length of time that the treatment will remain effective could not be estimated since there was no noticeable change in its soil resistance and wetting out characteristics. During this time, the natural elements of rain, snow etc. washed the windows free of any accumulated dirt.

The highly effective nature of the hydrosols of this invention in improving the wetting out properties is even more surprising when it is evaluated as a treatment for certain types of plastics. One particular type of plastic, polytetrafluoroethylene is noted for its hydrophobic properties. However, when the surface of a polytetrafluoroethylene article is treated by wiping it with one of the hydrosols of this invention, the surface will thereafter readily be wet out with plain water. The treatment of this invention is of course equally applicable to other types of materials in addition to the glass and the specifically named plastic, polytetrafluoroethylene. For example, there has been a recent trend to the use of acrylate sheeting in place of glass for windows. This material is highly prone to soiling. However, when the acrylate sheeting is treated with a film of the hydrosol of this invention, it will resist soiling in approximately the same manner as glass treated in accordance with the process of this invention.

If the environment in which the material to be treated so as to be soil retardant in accordance with the process of this invention contains a relatively large amount of negatively charged soils or negatively charged oily contaminants in the air it is of considerable advantage to apply a layer of a negatively charged colloidal silica over the positively charged hydrophilic, hydrosol layer of the metallic salt in order to prevent the buildup over a period of time of a hydrophobic film over the hydrophilic film of this invention and thereby compromise the self cleaning properties of the hydrophilic film described above. It is also of some advantage to apply the colloidal silica in areas which are not subject to excessively heavy soiling with oily contaminants since this treatment will, to some extent, even further extend the useful life of the hydrophilic soil retardant layer. Because of the positive charge of the initial positively charged layer, the silica layer can be applied in a very thin layer which does not have the surface or substantially affect its hydrophilic properties.

The colloidal dispersions of silica used in the process of this invention are preferably in the form of a dispersion in water of silica particles which have previously been treated so that the resulting dispersion is colloidal and at the same time, characterized by the fact that the colloidally dispersed particles carry a negative charge. The particles preferably have a size in the order of fifteen millimicrons or smaller. One such colloidal dispersion containing about 30% silica is sold by E. I. du Pont de Nemours Company under the trade name of "Ludox." The colloidal silica film is applied directly to the previously formed film of the hydrosol. An advantage of this invention is that if the silica layer is desired or required, it can be applied in the same manner as that employed through the application of the initial film of the hydrosol of the metal salt, that is, by simply wiping it on to the surface of the material to be treated.

The previously applied film of the colloidal metal salt is strongly cationic and therefore forms a strong bond between the glass and the silica layer without the use of heat or other expedients which were heretofore required in order to obtain a permanent treatment.

It should be appreciated that the positively charged coating disclosed above while being especially useful as soil retardant is not limited to this use. These are many other applications wherein changing the surface charge from a positive charge to a negative charge is highly desirable. For example, paper can be treated in this manner so as to have a positively charged paper surface which makes it especially useful in electrostatic printing.

In order to further illustrate the coatings included within the scope of the present invention and to further disclose the method of forming these coatings on various materials the following examples are given by way of illustration. It should be appreciated, however, that these examples are not intended to limit in any way the scope of the subjoined claims.

EXAMPLE 1

To 1000 parts by weight of water, 50 parts by weight of $SnCl_4 \cdot 5H_2O$ was added and caused to go into solution. Finely divided metallic tin was added with stirring and the mixture was heated to 80°–90° C. Care was taken to keep the mixture below the boiling point. As the temperature increased, a change in color occurred. At about 70° C., a slight yellowing became noticeable. At about 80° C. the color became a deep amber. At this point the system was allowed to cool and the hydrosol was decanted from the residual metallic tin. This solution was wiped onto a pane of glass and a pane of polymethylmethacrylate. The resulting film was measured with an electron microscope and light interference techniques and found to be approximately 1000 angstroms thick. There was no noticeable change in the color or the transparency of the sheet as a result of the application of the coating. Each of the sheets was divided into vertical halves. A half of each sample was further treated with an anionic dispersion of silica. A third pane of glass and a third pane of clear polymethylmethacrylate which was not given any treatment was exposed to the same conditions. Each of the samples were observed visually over an 18 month period. The untreated sample rapidly became soiled and had to be periodically cleaned. Both the glass and the polymethylmethacrylate samples resisted soiling and after each rain, appeared to cleanse itself of accumulated soil. After about 12 months, the portion of each pane which was not treated with the silica began to show the visual accumulation of the soil which was found to be somewhat oily in nature. This portion of the sample despite the accumulation of the oily residue was still far superior to the untreated sample, even after 18 months of exposure with regard to soil resistance.

EXAMPLE 2

The steps of Example 1 were carried out using $FeCl_3 \cdot 6H_2O$ in place of the stannic chloride and finely divided metallic iron in place of the metallic tin. Approximately equivalent results were obtained in the testing.

EXAMPLE 3

The steps of Example 1 were carried out using $Cr_2(C_2O_4)_3$ in place of the stannic chloride and finely divided nickel in place of the metallic tin. Approximately equivalent results were obtained in testing.

EXAMPLE 4

The steps of Example 1 were carried out using $CrCl_3$ in place of the stannic chloride and finely divided nickel in place of the metallic tin. Approximately equivalent results were obtained in the testing procedure.

EXAMPLE 5

The steps of Example 1 were carried out using $BiCl_5$ in place of the stannic chloride and finely divided metallic bismuth in place of metallic tin. Approximately equivalent results were obtained in the testing procedure.

EXAMPLE 6

The steps of Example 1 were carried out using $Fe(C_2H_3O_2)_3$ in place of stannic chloride and finely divided metallic bismuth in place of metallic tin. Approximately equivalent results were obtained in the testing procedure.

EXAMPLE 7

The steps of Example 1 were carried out using finely divided metallic nickel in place of the finely divided metallic tin. Approximately equivalent results were obtained in the testing procedure.

EXAMPLE 8

The steps of Example 1 were carried out using $Sn(SO_4)_2$ in place of the stannic chloride and using finely divided metallic nickel in place of the finely divided metallic tin. Approximately equivalent results were obtained in the testing procedure.

EXAMPLE 9

The steps of Example 1 were carried out using finely divided metallic bismuth in place of the finely divided metallic tin. Approximately equivalent results were obtained in the testing procedure.

EXAMPLE 10

The steps of Example 1 were carried out using $Cr(C_2O_4)_3$ in place of the stannic chloride. Approximately equivalent results were obtained in the testing procedure.

What is claimed is:

1. The method of treating a negatively charged solid surface which comprises the steps of applying to the solid surface a positively charged stable hydrosol consisting of a solution in water of a metallic salt, the metallic ions thereof which are in two different stable states of oxidation simultaneously while in solution, in an amount sufficient to form a positively charged soil retardant hydrophilic layer on said solid surface.

2. The method according to claim 1 wherein the positively charged hydrosol consists of a colloidal system containing a salt of tin in water.

3. The method according to claim 1 in which the positively charged hydrosol consists of a colloidal system containing a salt of cobalt in water.

4. The method according to claim 1 wherein the positively charged hydrosol consists of a colloidal system containing a salt of chromium in water.

5. The method according to claim 1 wherein the positively charged hydrosol consists of a colloidal system containing a salt of cobalt in water.

6. The method according to claim 1 wherein a negatively charged colloidal dispersion of silica is applied over said positively charged hydrophilic layer thereby forming a negatively charged outer silica film.

7. The composition of matter comprised of a substratum having a negatively charged surface having deposited thereon a positively charged coating of a hydrophilic colloidal hydrosol of a metallic salt, the metallic ions thereof being present in two stable states of oxidation.

8. The soil retardant composition of matter comprised of a substratum having a negatively charged surface having deposited thereon a positively charged coating of a hydrophilic colloidal hydrosol of a metallic salt, the metallic ion thereof being present in two stable states of oxidation while in solution, said film being of sufficient thickness to impart soil retardance to said composition.

9. The composition according to claim 8 wherein said metallic salt is a salt of a member selected from the group consisting of tin, iron, chromium and cobalt.

10. The composition according to claim 8, wherein said positively charged film has deposited thereon a negatively charged film of colloidal silica.

11. The composition according to claim 8 wherein said negatively charged substratum is glass.

12. The composition according to claim 11 wherein said film is colorless and transparent to the naked eye and is approximately 1000 A. thick.

References Cited

UNITED STATES PATENTS 3,013,898  12/1961  Dempcy _____ 117—69

FOREIGN PATENTS 729,581  3/1966  Canada _____ 117—69

ALFRED L. LEAVITT, Primary Examiner

J. A. BELL, Assistant Examiner

U.S. Cl. X.R.

117—93.4 NC, 124 B, 138.9 UF, 138.8 U, 169 R; 252—313 R

UNITED STATES PATENT OFFICE
CERTIFICATE OF CORRECTION

Patent No. 3,676,186                    Dated  July 11, 1972

Inventor(s)  Louis L. Pytlewski

It is certified that error appears in the above-identified patent and that said Letters Patent are hereby corrected as shown below:

35 U.S.C. 254

Column 6, line 55, change "cobalt" to --iron--.

35 U.S.C. 255

Column 1, line 41, change "composition" to --compositions--.
Column 1, line 50, delete "were".
Column 1, line 57, delete "of".
Column 1, line 66, change "surface" to --surfaces--.
Column 2, line 14, delete "of".
Column 2, lines 54 and 55, change "smooth, however" to --smooth. However,--.
Column 2, line 57, change "riles" to --rills--.
Column 2, line 72, delete the comma.
Column 3, line 25, change "oxidation" to --hydration--.
Column 3, line 26, change "$OH_2$" to --$H_2O$--.
Column 3, line 29, change "$Sn(OH)_2$" to --$Sn(OH)_2^{+2}$--.
Column 3, line 29, change "2 + $H^+$" to -- $H^+$--.
Column 3, line 60, change "what" to --such--; same line, insert --as-- after "soiling" (second occurrence).
Column 4, line 25, insert a comma before "is".
Column 4, line 57, change "have" to --harm--.
Column 5, line 23, change "was" to --were--.
Column 5, line 48, change "itself" to --themselves--.

Signed and sealed this 9th day of January 1973.

(SEAL)
Attest:

EDWARD M. FLETCHER, JR.          ROBERT GOTTSCHALK
Attesting Officer                 Commissioner of Patents